United States Patent
Vassell

[11] Patent Number: 6,155,627
[45] Date of Patent: Dec. 5, 2000

[54] LEAF GUARD FOR A VEHICLE

[76] Inventor: Anthony M. Vassell, 1285 NE. 151st St., North Miami Beach, Fla. 33162

[21] Appl. No.: 09/078,697

[22] Filed: May 14, 1998

[51] Int. Cl.[7] .................................................. B62D 25/10
[52] U.S. Cl. ........................ 296/95.1; 296/192; 454/146
[58] Field of Search ............................ 296/91, 95.1, 192; 454/146

[56] References Cited

U.S. PATENT DOCUMENTS

| | | | |
|---|---|---|---|
| 2,243,029 | 5/1941 | Cupit | 296/91 |
| 3,574,392 | 4/1971 | Hirano | 296/91 |
| 4,170,381 | 10/1979 | Helm | 296/91 |
| 4,679,845 | 7/1987 | Detampel et al. | 296/192 |
| 5,451,090 | 9/1995 | Brodie et al. | 296/192 |
| 5,452,935 | 9/1995 | Mascia | 296/136 |
| 5,692,953 | 12/1997 | Bell et al. | 296/192 X |
| 5,755,483 | 5/1998 | Lund | 296/91 |

FOREIGN PATENT DOCUMENTS

| | | | |
|---|---|---|---|
| 406087467 | 3/1994 | Japan | 296/192 |
| 1736808 | 5/1992 | U.S.S.R. | 296/192 |

*Primary Examiner*—Joseph D. Pape

[57] ABSTRACT

A new leaf guard for a vehicle for helping keep leaves and other debris from collecting in the space between the windshield and hood of a vehicle. The inventive device includes an elongate base with its upper surface adapted for attachment to the hood of a vehicle. The lower portion of an elongate connector flange is coupled to one of the sides of the base. One sides of a cover member is pivotally coupled to an upper portion of the connector flange. The lower surface of the cover member is adapted for positioning over the space between the windshield and hood of a vehicle to help keep leaves and debris from accumulating in the space.

3 Claims, 2 Drawing Sheets

LEAF GUARD FOR A VEHICLE

BACKGROUND OF THE INVENTION

1. Field of the Invention

The present invention relates to covering devices for vehicles and more particularly pertains to a new leaf guard for a vehicle for helping keep leaves and other debris from collecting in the space between the windshield and hood of a vehicle.

2. Description of the Prior Art

The use of covering devices for vehicles is known in the prior art. More specifically, covering devices for vehicles heretofore devised and utilized are known to consist basically of familiar, expected and obvious structural configurations, notwithstanding the myriad of designs encompassed by the crowded prior art which have been developed for the fulfillment of countless objectives and requirements.

Known prior art covering devices for vehicles include U.S. Pat. No. 5,290,085; U.S. Pat. No. 4,952,006; U.S. Pat. No. 4,635,993; U.S. Pat. No. 5,348,363; U.S. Pat. No. Des. 298,615; and U.S. Pat. No. 5,375,379.

While these devices fulfill their respective, particular objectives and requirements, the aforementioned patents do not disclose a new leaf guard for a vehicle. The inventive device includes an elongate base with its upper surface adapted for attachment to the hood of a vehicle. The lower portion of an elongate connector flange is coupled to one of the sides of the base. One sides of a cover member is pivotally coupled to an upper portion of the connector flange. The lower surface of the cover member is adapted for positioning over the space between the windshield and hood of a vehicle to help keep leaves and debris from accumulating in the space.

In these respects, the leaf guard for a vehicle according to the present invention substantially departs from the conventional concepts and designs of the prior art, and in so doing provides an apparatus primarily developed for the purpose of helping keep leaves and other debris from collecting in the space between the windshield and hood of a vehicle.

SUMMARY OF THE INVENTION

In view of the foregoing disadvantages inherent in the known types of covering devices for vehicles now present in the prior art, the present invention provides a new leaf guard for a vehicle construction wherein the same can be utilized for helping keep leaves and other debris from collecting in the space between the windshield and hood of a vehicle.

The general purpose of the present invention, which will be described subsequently in greater detail, is to provide a new leaf guard for a vehicle apparatus and method which has many of the advantages of the covering devices for vehicles mentioned heretofore and many novel features that result in a new leaf guard for a vehicle which is not anticipated, rendered obvious, suggested, or even implied by any of the prior art covering devices for vehicles, either alone or in any combination thereof.

To attain this, the present invention generally comprises an elongate base with its upper surface adapted for attachment to the hood of a vehicle. The lower portion of an elongate connector flange is coupled to one of the sides of the base. One sides of a cover member is pivotally coupled to an upper portion of the connector flange. The lower surface of the cover member is adapted for positioning over the space between the windshield and hood of a vehicle to help keep leaves and debris from accumulating in the space.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new leaf guard for a vehicle apparatus and method which has many of the advantages of the covering devices for vehicles mentioned heretofore and many novel features that result in a new leaf guard for a vehicle which is not anticipated, rendered obvious, suggested, or even implied by any of the prior art covering devices for vehicles, either alone or in any combination thereof.

It is another object of the present invention to provide a new leaf guard for a vehicle which may be easily and efficiently manufactured and marketed.

It is a further object of the present invention to provide a new leaf guard for a vehicle which is of a durable and reliable construction.

An even further object of the present invention is to provide a new leaf guard for a vehicle which is susceptible of a low cost of manufacture with regard to both materials and labor, and which accordingly is then susceptible of low prices of sale to the consuming public, thereby making such leaf guard for a vehicle economically available to the buying public.

Still yet another object of the present invention is to provide a new leaf guard for a vehicle which provides in the apparatuses and methods of the prior art some of the advantages thereof, while simultaneously overcoming some of the disadvantages normally associated therewith.

Still another object of the present invention is to provide a new leaf guard for a vehicle for helping keep leaves and other debris from collecting in the space between the windshield and hood of a vehicle.

Yet another object of the present invention is to provide a new leaf guard for a vehicle which includes an elongate base with its upper surface adapted for attachment to the hood of a vehicle. The lower portion of an elongate connector flange is coupled to one of the sides of the base. One sides of a cover member is pivotally coupled to an upper portion of the connector flange. The lower surface of the cover member is adapted for positioning over the space between the windshield and hood of a vehicle to help keep leaves and debris from accumulating in the space.

Still yet another object of the present invention is to provide a new leaf guard for a vehicle that helps solve the problem people who park underneath trees have with leaves falling into the vented area between the windshield and the hood of their vehicle.

Even still another object of the present invention is to provide a new leaf guard for a vehicle that helps prevent leaves and other debris from accumulating in the air intakes located adjacent the hood of a vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
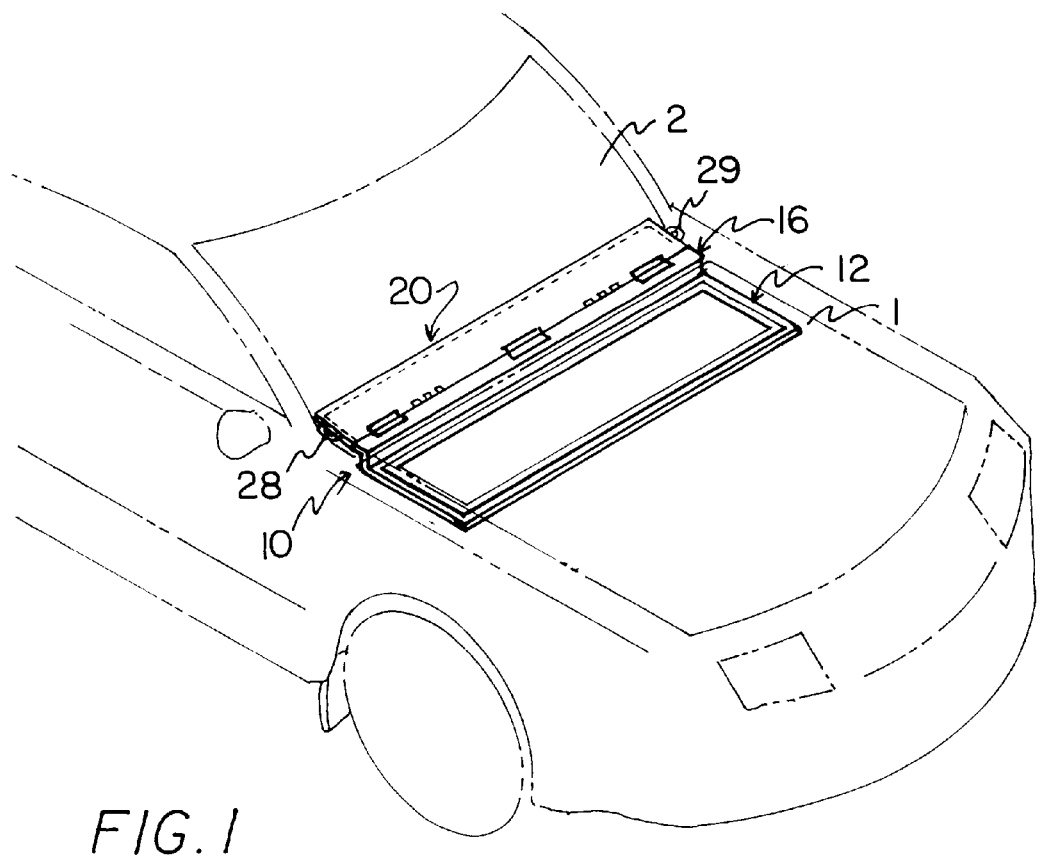
FIG. 1 is a schematic perspective view of a new leaf guard for a vehicle in use on a vehicle according to the present invention.
Figure 2:
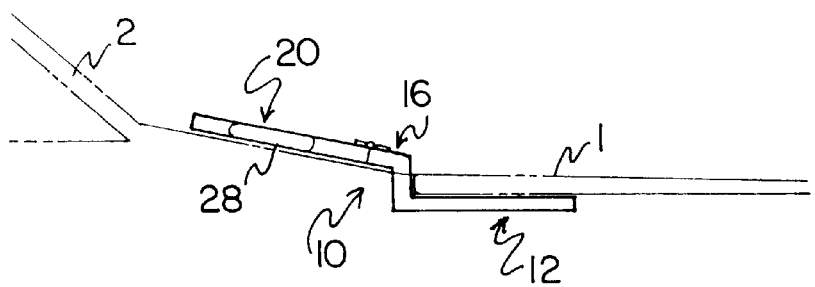
FIG. 2 is a schematic side view of the present invention in use on a vehicle.
Figure 3:
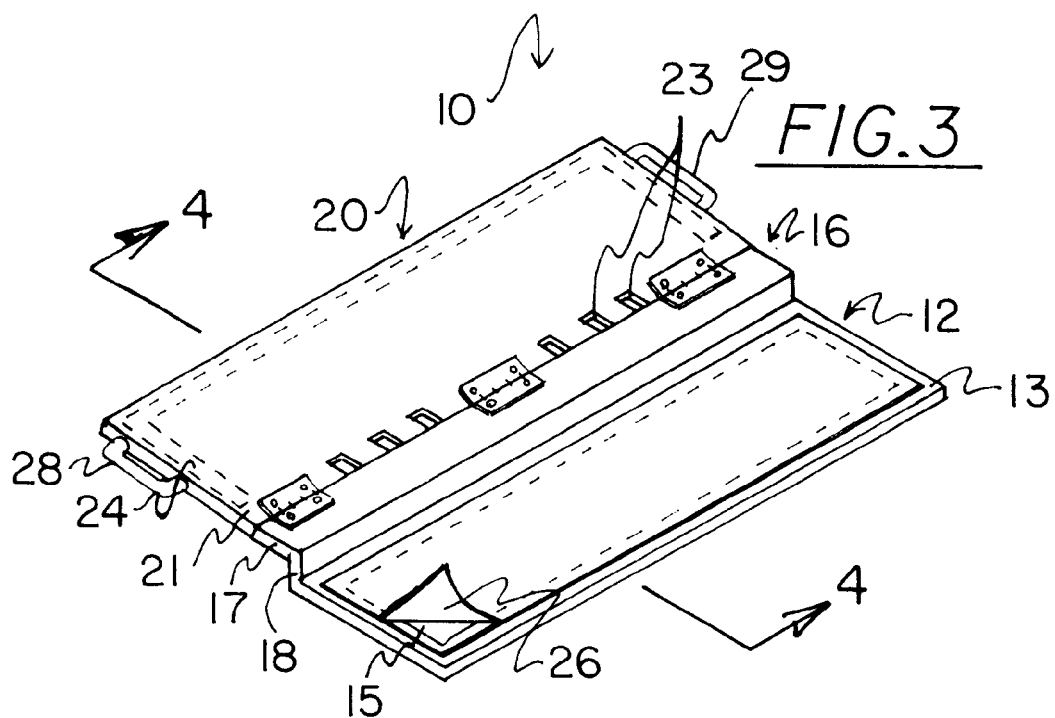
FIG. 3 is a schematic perspective view of the present invention.
Figure 4:
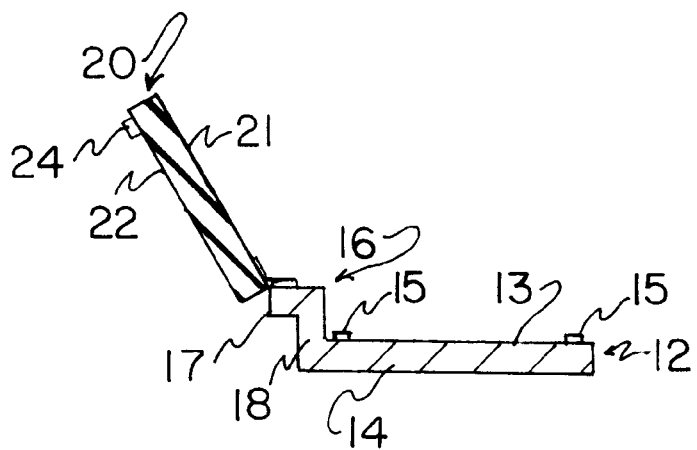
FIG. 4 is a schematic cross sectional view of the present invention taken from line 4—4 of FIG. 3.

With reference now to the drawings, and in particular to FIGS. 1 through 4 thereof, a new leaf guard for a vehicle embodying the principles and concepts of the present invention and generally designated by the reference numeral 10 will be described.

As best illustrated in FIGS. 1 through 4, the leaf guard for a vehicle 10 generally comprises an elongate base 12 with its upper surface 13 adapted for attachment to the hood 1 of a vehicle. The lower portion 18 of an elongate connector flange 16 is coupled to one of the sides of the base 12. One sides of a cover member 20 is pivotally coupled to an upper portion 17 of the connector flange 16. The lower surface 22 of the cover member 20 is adapted for positioning over the space between the windshield 2 and hood 1 of a vehicle to help keep leaves and debris from accumulating in the space.

In use, the leaf guard for a vehicle 10 is designed for mounting to a vehicle for helping prevent leaves and other debris from accumulating in the space between the windshield 2 and the hood 1 of the vehicle. Specifically, the elongate base 12 is generally rectangular and has substantially planar upper and lower surfaces 13,14, and a pair of opposite ends, with a pair of sides extending between the ends of the base 12. The upper surface 13 of the base 12 is adapted for attachment to the underside of a hood 1 of a vehicle. Preferably, the upper surface 13 of the base 12 has a magnet 15 is attached thereon for permitting attachment to the hood 1 of a vehicle. The magnet 15 is ideally provided in a rectangular strip extending around the outer periphery of the base 12. In this ideal embodiment, the magnetic strip has an adhesively attached peel off protective sheet 26 thereon for protecting it before use.

The elongate connector flange 16 has a generally inverted L-shaped cross section with an upper portion 17 and a lower portion 18. The lower portion of the connector flange 16 is coupled to one of the sides of the base 12 so that the length of the connector flange 16 preferably extending between the ends of the base 12. The lower portion 18 of the connector flange 16 is upwardly extended substantially perpendicular from the upper surface 13 of the base 12 while the upper portion 17 of the connector flange 16 is outwardly extended from the one side of the base 12.

The elongate cover member 20 is also preferably generally rectangular and has upper and lower surfaces 21,22, and a pair of opposite ends with a pair of sides extending between its ends. The lower surface 22 of the cover member 20 is adapted for positioning over the space between the windshield 2 and hood 1 of a vehicle to help keep leaves and debris from accumulating in the space. Preferably, the lower surface 22 of the cover member 20 has a magnet 24 provided coupled thereon for permitting attachment to a vehicle. The magnet 15 is preferably in a U-shaped strip which extends along the outer periphery of the cover member 20. Optionally, a pair of handles 28.29 are coupled to the cover member with one handle extending from one of the sides of the cover member and another handle extending from the other side of the cover member.

One of the sides of the cover member 20 is pivotally coupled by hinges to the upper portion 17 of the connector flange 16 with the length of the connector flange 16 extends between the ends of the cover member 20 and so that the upper surface 21 of the cover member 20 is pivotable towards the upper surface 13 of the base 12 so that the hood of the vehicle may be easily raised when the device 10 is in use on the vehicle. In the preferred embodiment, the one side of the cover member 20 also has a plurality of spaced slots 23 extending between the upper and lower surfaces 21,22 of the cover member 20. The slots 23 are designed for permitting the passage of air therethrough and are adapted for positioning over air vents of a vehicle located between the windshield 2 and hood 1 of the vehicle.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A device for mounting to a vehicle for helping prevent leaves and other debris from accumulating in the space between the windshield and the hood of the vehicle, said device comprising:

an elongate base having upper and lower surfaces, a pair of opposite ends, and a pair of sides extending between said ends of said base;

said upper surface of said base being adapted for attachment to the hood of a vehicle;

an elongate connector flange having a length, an upper portion and a lower portion, said lower portion of said connector flange being coupled to one of said sides of said base;

an elongate cover member having upper and lower surfaces, a pair of opposite ends and a pair of sides extending between said ends of said cover member;

said lower surface of said cover member being adapted for positioning over the space between the windshield and hood of a vehicle to help keep leaves and debris from accumulating in the space; and one of said sides of said cover member being pivotally coupled to said upper portion of said connector flange, said length of said connector flange being extended between said ends of said cover member, said upper surface of said cover member being pivotable towards said upper surface of said base;

wherein said upper surface of said base has a magnet being provided thereon for permitting attachment to the hood of a vehicle;

wherein said length of said connector flange is extended between said ends of said base;

wherein said lower portion of said connector flange is extended substantially perpendicular from said upper surface of said base, and wherein said upper portion of said connector flange is outwardly extended from said one side of said base;

wherein said lower surface of said cover member has a magnet being provided thereon for permitting attachment to a vehicle;

wherein said one side of said cover member has a plurality of spaced slots extending between said upper and lower surfaces of said cover member, said slots being for permitting the passage of air therethrough.

2. The device of claim 1, wherein said base and said cover member are generally rectangular.

3. A device for mounting to a vehicle for helping prevent leaves and other debris from accumulating in the space between the windshield and the hood of the vehicle, said device comprising:

an elongate base being generally rectangular and having upper and lower surfaces, a pair of opposite ends, and a pair of sides extending between said ends of said base;

said upper surface of said base being adapted for attachment to the hood of a vehicle, wherein said upper surface of said base has a magnet being provided thereon for permitting attachment to the hood of a vehicle;

an elongate connector flange having a length, and an upper portion and a lower portion, said length of said connector flange being extended between said ends of said base, said lower portion of said connector flange being coupled to one of said sides of said base, said lower portion of said connector flange being extended substantially perpendicular from said upper surface of said base, said upper portion of said connector flange being outwardly extended from said one side of said base;

an elongate cover member being generally rectangular and having upper and lower surfaces, a pair of opposite ends and a pair of sides extending between said ends of said cover member;

said lower surface of said cover member being adapted for positioning over the space between the windshield and hood of a vehicle to help keep leaves and debris from accumulating in the space, wherein said lower surface of said cover member has a magnet being provided thereon for permitting attachment to a vehicle;

one of said sides of said cover member being pivotally coupled to said upper portion of said connector flange, said length of said connector flange being extended between said ends of said cover member, said upper surface of said cover member being pivotable towards said upper surface of said base; and said cover member having a plurality of spaced slots extending between said upper and lower surfaces of said cover member, said slots being for permitting the passage of air therethrough.

* * * * *